US010339477B2

(12) United States Patent
Kannan et al.

(10) Patent No.: US 10,339,477 B2
(45) Date of Patent: Jul. 2, 2019

(54) METHOD AND APPARATUS FOR FACILITATING STAFFING OF RESOURCES

(71) Applicant: [24]7.ai, Inc., San Jose, CA (US)

(72) Inventors: Pallipuram V. Kannan, Saratoga, CA (US); Kranthi Mitra Adusumilli, Hyderabad (IN)

(73) Assignee: [24]7.ai, Inc., San Jose, CA (US)

(*) Notice: Subject to any disclaimer, the term of this patent is extended or adjusted under 35 U.S.C. 154(b) by 434 days.

(21) Appl. No.: 14/964,540

(22) Filed: Dec. 9, 2015

(65) Prior Publication Data

US 2016/0171424 A1 Jun. 16, 2016

Related U.S. Application Data

(60) Provisional application No. 62/090,298, filed on Dec. 10, 2014.

(51) Int. Cl.
G06Q 10/06 (2012.01)
G06Q 30/02 (2012.01)

(52) U.S. Cl.
CPC ........... *G06Q 10/063118* (2013.01); *G06Q 10/06313* (2013.01); *G06Q 30/0202* (2013.01)

(58) Field of Classification Search
USPC ........................................................ 705/7.17
See application file for complete search history.

(56) References Cited

U.S. PATENT DOCUMENTS

| | | | |
|---|---|---|---|
| 6,978,006 B1 | 12/2005 | Polcyn | |
| 2005/0177414 A1* | 8/2005 | Priogin | G06Q 10/06 706/21 |
| 2006/0235740 A1* | 10/2006 | Lea | G06Q 10/06 705/7.21 |
| 2007/0230681 A1* | 10/2007 | Boyer | G06Q 30/016 379/265.1 |
| 2011/0137701 A1 | 6/2011 | Tsipenyuk et al. | |

(Continued)

FOREIGN PATENT DOCUMENTS

CA 2522612 A1 12/2004

OTHER PUBLICATIONS

Dice. "Big Brother, The Orwellian Nightmare Come True", 2011, San Diego, CA.

*Primary Examiner* — Johnna R Loftis
*Assistant Examiner* — Matthew D Henry
(74) *Attorney, Agent, or Firm* — Perkins Coie LLP

(57) ABSTRACT

A computer-implemented method and an apparatus for facilitating staffing of resources receives customer data corresponding to a plurality of customers of an enterprise. At least one intention is predicted for each customer to configure a plurality of intentions. An expected volume of interactions is estimated for at least one time period based on the plurality of intentions. Each interaction in the expected volume of interactions is associated with interaction attributes. Resource data corresponding to a plurality of resources of the enterprise is received. Each resource is associated with a plurality of resource attributes. At least one resource is mapped to each interaction based on a match between resource attributes associated with the at least one resource and the interaction attributes associated with the each interaction. A staffing of the plurality of resources is facilitated based on the mapping of the at least one resource to the each interaction.

21 Claims, 7 Drawing Sheets

(56) References Cited

U.S. PATENT DOCUMENTS

2014/0249872 A1    9/2014  Stephan et al.
2014/0337092 A1*  11/2014  Patel .................. G06Q 30/0201
                                              705/7.29

* cited by examiner

METHOD AND APPARATUS FOR FACILITATING STAFFING OF RESOURCES

CROSS REFERENCE TO RELATED APPLICATIONS

This application claims priority to U.S. provisional patent application Ser. No. 62/090,298, filed Dec. 10, 2014, which is incorporated herein in its entirety by this reference thereto.

TECHNICAL FIELD

The invention generally relates to staffing of resources and more particularly, to a method and apparatus for facilitating staffing of resources associated with customer support operations of enterprises.

BACKGROUND

Customer sales and service are vital components for success of any enterprise and often a differentiating factor between competing enterprises. Accordingly, many enterprises deploy human and/or machine-based resources for interacting with the customers for selling to them, for answering their queries and/or for resolving their concerns. The primary objective of deployment of resources is to promptly handle the customer interactions. However, staffing of adequate resources is often a challenge. Conventional mechanisms staff resources based on historically observed averages of customer interactions over a similar time period. However, such mechanisms typically lead to over staffing or under-staffing of resources, resulting in poor customer experience and/or operating losses. Therefore, it is desirable to reduce instances of under staffing and over staffing of resources, and, moreover to appropriately staff resources for handling fluctuations in volume of customer interactions.

SUMMARY

In an embodiment of the invention, a computer-implemented method for facilitating staffing of resources is disclosed. The method receives customer data corresponding to a plurality of customers of an enterprise. The method predicts, by a processor, at least one intention for each customer from among the plurality of customers using data corresponding to the each customer in the customer data. The prediction of the at least one intention for the each customer configures a plurality of intentions. Further, the method estimates, by the processor, an expected volume of interactions for at least one time period based on the plurality of intentions. Each interaction in the expected volume of interactions is associated with one or more interaction attributes. The method receives resource data corresponding to a plurality of resources of the enterprise. Each resource from among the plurality of resources is associated with a plurality of resource attributes. Further, the method maps, by the processor, at least one resource from among the plurality of resources to the each interaction in the expected volume of interactions based on a match between respective resource attributes associated with the at least one resource and the one or more interaction attributes associated with the each interaction. Further, the method facilitates, by the processor, a staffing of the plurality of resources of the enterprise based, at least in part, on the mapping of the at least one resource to the each interaction.

In another embodiment of the invention, an apparatus for facilitating staffing of resources includes at least one processor and a memory. The memory stores machine executable instructions therein, that when executed by the at least one processor, cause the apparatus to receive customer data corresponding to a plurality of customers of an enterprise. The apparatus predicts at least one intention for each customer from among the plurality of customers using data corresponding to the each customer in the customer data. The prediction of the at least one intention for the each customer configures a plurality of intentions. The apparatus estimates an expected volume of interactions for at least one time period based on the plurality of intentions. Each interaction in the expected volume of interactions is associated with one or more interaction attributes. The apparatus receives resource data corresponding to a plurality of resources of the enterprise. Each resource from among the plurality of resources is associated with a plurality of resource attributes. Further, the apparatus maps at least one resource from among the plurality of resources to the each interaction in the expected volume of interactions based on a match between respective resource attributes associated with the at least one resource and the one or more interaction attributes associated with the each interaction. Further, the apparatus facilitates a staffing of the plurality of resources of the enterprise based, at least in part, on the mapping of the at least one resource to the each interaction.

In another embodiment of the invention, a non-transitory computer-readable medium storing a set of instructions that when executed cause a computer to perform a method for facilitating staffing of resources is disclosed. The method executed by the computer receives customer data corresponding to a plurality of customers of an enterprise. The method predicts at least one intention for each customer from among the plurality of customers using data corresponding to the each customer in the customer data. The prediction of the at least one intention for the each customer configures a plurality of intentions. The method estimates an expected volume of interactions for at least one time period based on the plurality of intentions. Each interaction in the expected volume of interactions is associated with one or more interaction attributes. The method receives resource data corresponding to a plurality of resources of the enterprise. Each resource from among the plurality of resources is associated with a plurality of resource attributes. Further, the method maps at least one resource from among the plurality of resources to the each interaction in the expected volume of interactions based on a match between respective resource attributes associated with the at least one resource and the one or more interaction attributes associated with the each interaction. Further, the method facilitates a staffing of the plurality of resources of the enterprise based, at least in part, on the mapping of the at least one resource to the each interaction.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
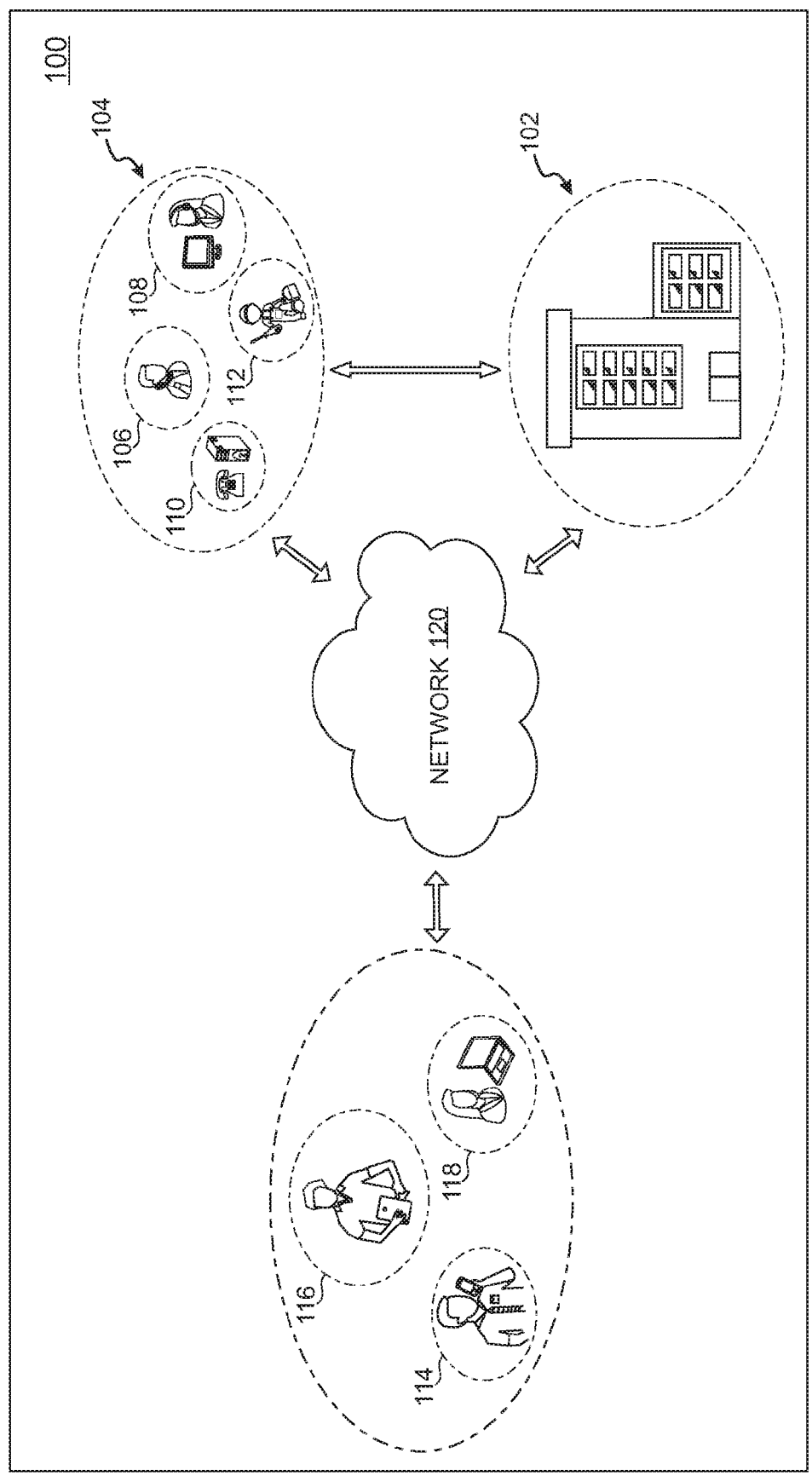
FIG. 1 shows an example representation of resources deployed by an enterprise for addressing customer support requirements, in accordance with an example scenario.

FIG. 1 shows an example representation 100 of resources deployed by an enterprise 102 for addressing customer support requirements, in accordance with an example scenario. It is understood that the enterprise 102 may be any firm or organization (for example, a corporation, a small business or even a brick and mortar entity) offering products, services and/or information to existing and prospective users (hereinafter collectively referred to as customers). It is also understood that the enterprise 102 may employ physical means (for example, stores or retail outlets, etc.) and/or virtual means (for example, websites, social media, native mobile applications etc.) to conduct business with its customers.

Enterprises, such as the enterprise 102, may typically deploy resources for customer support operations. In some example scenarios, enterprises may extend a dedicated customer support facility for serving their customers. The customer support facility may include human resources and/or machine-based resources, such as customer service representatives or agents, automated chat agents or chat bots, interactive voice response (IVR) systems and/or self assist systems such as either web or mobile digital self-service systems for interacting with the customers, providing them with information, selling to them, answering their queries and addressing their concerns. The enterprise 102 is depicted to be associated with such an example customer support facility 104. The customer support facility 104 is exemplarily depicted to include two human agents 106 and 108 (who provide customers with voice-based assistance and chat-based/online assistance, respectively), an automated voice response system, such as an IVR system 110 and a direct sales/service personnel 112. It is understood that the customer support facility 104 may also include automated chat agents such as chat bots, and, web or digital self-assist mechanisms such as web pages including frequently asked questions (FAQ) content or self-help forms and questionnaires. Moreover, it is noted that customer support facility 104 is depicted to include only two human agents, one IVR system and one direct sales/service personnel for illustration purposes and it is understood that the customer support facility 104 may include fewer or more number of resources than those depicted in FIG. 1.

The environment 100 further depicts a plurality of customers, such as a customer 114, a customer 116 and a customer 118. It is understood that three customers are depicted herein for example purposes and that the enterprise 102 may be associated with many such customers. In some example scenarios, the customers 114, 116 and 118 may interact with resources deployed at the customer support facility 104 over a network 120 using their respective electronic devices. Examples of such electronic devices may include mobile phones, Smartphones, laptops, personal computers, tablet computers, personal digital assistants, Smart watches, wearable devices and the like. Examples of the network 120 may include wired networks, wireless networks or a combination thereof. Examples of the wired networks may include Ethernet, local area network (LAN), fiber-optic cable network and the like. Examples of the wireless networks may include cellular networks like GSM/3G/4G/CDMA based networks, wireless LAN, Bluetooth or Zigbee networks and the like. An example of a combination of wired networks and wireless networks may include the Internet.

a primary objective of deployment of resources at the customer support facility 104 is to promptly handle customer interactions, which may be facilitated over a plurality of interaction channels, such as a voice channel, a chat channel, a native mobile application channel, a web/online channel, a social media channel and the like. However, staffing of adequate resources is often a challenge. Conventional mechanisms staff resources based on historically observed averages of customer interactions over a similar time period. However, such mechanisms typically lead to over staffing or under-staffing of resources. For example, an understaffing of resources may occur when the customer support facility 104 is unable to handle increased customer interactions during peak business hours, special promotional events and the like. In such a scenario, the customers having called the customer service facility 104 for resolution of concerns have to wait for a long time to interact with customer service representatives. Similarly, an overstaffing of resources may occur, when a large number of customer service representatives may be available at any given point in time to handle interactions for only a few customers.

Various embodiments of the invention provide methods and apparatuses that are capable of overcoming these and other obstacles and providing additional benefits. More specifically, methods and apparatuses disclosed herein suggest techniques for appropriately staffing of resources associated with customer support operations for handling fluctuations in volume of the customer interactions and thereby reducing instances of under staffing and over staffing of resources. An apparatus configured to facilitate staffing of resources is explained with reference to FIG. 2.

Figure 2:
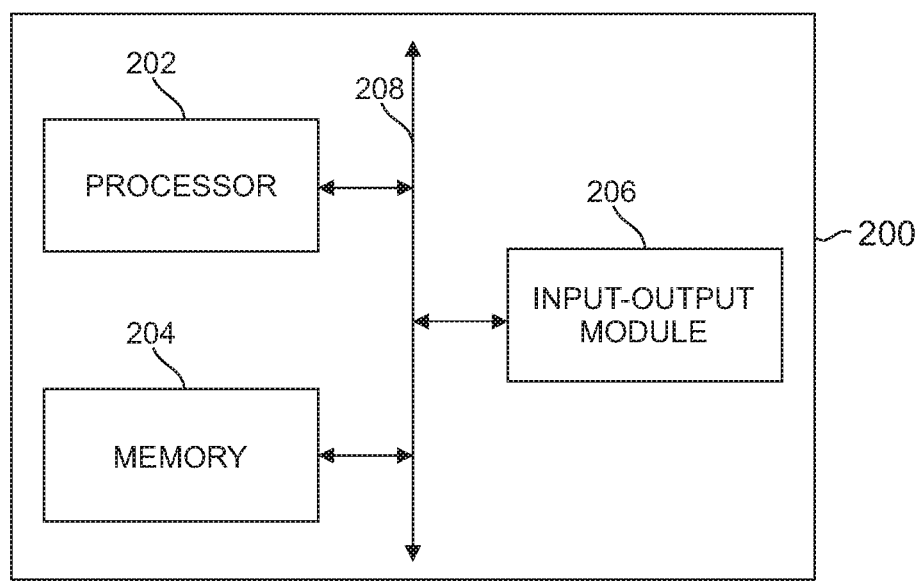
FIG. 2 is a block diagram showing an example apparatus configured to facilitate staffing of resources, in accordance with an embodiment of the invention.

FIG. 2 is a block diagram showing an example apparatus 200 configured to facilitate staffing of resources of enterprises, in accordance with an embodiment of the invention. The term 'resources' as used herein refers to human and machine-based resources associated with customer support operations of enterprises. Some non-limiting examples of human resources may include human agents for handling voice interactions and/or text-based interactions (for example, chat interactions or social media interactions) with customers, direct sales/service personnel and the like. Examples of the machine-based resources may include, but are not limited to, chat bots (for example, virtual chat agents), interactive voice response (IVR) systems, digital web or mobile self-assist mechanisms (such as for example, digital kiosks etc.), physical resources including web servers which host websites, social media sites etc., and/or communication equipment which facilitate interaction with customers, and the like. It is understood that in some example scenarios, the human resources and machine-based resources may collectively handle interactions with customers. In an illustrative example, a customer interaction with an IVR system may be transferred to a human agent to more effectively address the customer's concern. In another illustrative example, a human agent may proactively provide a customer on a website with a web link to a self-help web page (for example, a web page including FAQ content) to assist the customer with a customer's specific requirement. Furthermore, the term 'facilitating a staffing of resources' as used herein implies enabling appropriate staffing of resources of an enterprise for different time periods (for example, days, weeks, months etc.) such that a skill/capability of the resource is effectively utilized for adequately assisting the customers, while simultaneously precluding instances of overstaffing and understaffing of resources. It is noted that the facilitation of staffing of resources is explained hereinafter with respect to one enterprise. However, it is understood that the apparatus 200 is configured to facilitate staffing of resources for multiple enterprises. Moreover, as explained with reference to FIG. 1, the term 'enterprise' as used herein refers to any firm or organization (for example, a corporation, a small business or even a brick and mortar entity) offering products, services and/or information to existing and prospective customers.

The apparatus 200 includes at least one processor, such as a processor 202 and a memory 204. It is noted that although the apparatus 200 is depicted to include only one processor, the apparatus 200 may include more number of processors therein. In an embodiment, the memory 204 is capable of storing machine executable instructions. Further, the processor 202 is capable of executing the stored machine executable instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.).

The apparatus 200 also includes an input/output module 206 (hereinafter referred to as 'I/O module 206') for providing an output and/or receiving an input. The I/O module 206 is configured to be in communication with the processor 202 and the memory 204. Examples of the I/O module 206 include, but are not limited to, an input interface and/or an output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like. In an example embodiment, the processor 202 may include I/O circuitry configured to control at least some functions of one or more elements of the I/O module 206, such as, for example, a speaker, a microphone, a display, and/or the like. The processor 202 and/or the I/O circuitry may be configured to control one or more functions of the one or more elements of the I/O module 206 through computer program instructions, for example, software and/or firmware, stored on a memory, for example, the memory 204, and/or the like, accessible to the processor 202.

In an embodiment, the I/O module 206 may be configured to provide a user interface (UI) configured to enable enterprise users to utilize the apparatus 200 for dynamically managing a staffing of resources so as to preclude overstaffing and/or understaffing of resources. Furthermore, the I/O module 206 may be integrated with a monitoring mechanism configured to provide the enterprise users with real-time updates/alerts (for example, email notifications, SMS alerts, etc.) of changes to be made to the staffing of resources for efficiently addressing customer support requirements.

In an embodiment, various components of the apparatus 200, such as the processor 202, the memory 204 and the I/O module 206 are configured to communicate with each other via or through a centralized circuit system 208. The centralized circuit system 208 may be various devices configured to, among other things, provide or enable communication between the components (202-206) of the apparatus 200. In certain embodiments, the centralized circuit system 208 may be a central printed circuit board (PCB) such as a motherboard, a main board, a system board, or a logic board. The centralized circuit system 208 may also, or alternatively, include other printed circuit assemblies (PCAs) or communication channel media.

It is understood that the apparatus 200 as illustrated and hereinafter described is merely illustrative of an apparatus that could benefit from embodiments of the invention and, therefore, should not be taken to limit the scope of the invention. It is noted that the apparatus 200 may include fewer or more components than those depicted in FIG. 2. Moreover, the apparatus 200 may be implemented as a centralized apparatus, or, alternatively, the various components of the apparatus 200 may be deployed in a distributed manner while being operatively coupled to each other. In another embodiment, the apparatus 200 may be embodied as a mix of existing open systems, proprietary systems and third party systems. In another embodiment, the apparatus 200 may be implemented completely as a set of software layers on top of existing hardware systems. In an exemplary scenario, the apparatus 200 may be any machine capable of executing a set of instructions (sequential and/or otherwise) so as to facilitate staffing of resources.

In an embodiment, the processor 202 is configured to, with the content of the memory 204, cause the apparatus 200 to receive customer data corresponding to a plurality of customers of an enterprise. More specifically, the I/O module 206 of the apparatus 200 may be configured to receive the customer data, i.e. aggregate data corresponding to the customers of the enterprise. It is noted that the term 'customers' as used herein refers to both existing and prospective customers of the enterprise. The customer data may be received from customer support facilities, such as the customer support facility 104 explained with reference to FIG. 1, and/or, remote data gathering servers, which are configured to track activity of the customers of the enterprise on various enterprise interaction channels, such as websites, native mobile applications, social media etc. In an illustrative example, an existing customer of the enterprise may contact a human agent to make a bill payment. In such a scenario, information such as a concern category of the customer, a timing of the interaction, details of the agent handling the interaction, an outcome of the interaction and the like, may be gathered and provided by the customer support facility to the I/O module 206. In an embodiment, the customer support facilities and/or remote data gathering servers may provision the customer data to the I/O module 206 in real-time or on periodic basis in an online or an offline manner.

In an embodiment, the customer data includes data corresponding to the each customer of the enterprise. In an embodiment, the data corresponding to the each customer may include information related to at least one of (1) a profile of a customer; (2) interactions of the customer with the enterprise using one or more interaction channels; (3) locations associated with the customer; (4) a presence of the customer in the one or more enterprise interaction channels; (5) a current attention of the customer in an enterprise interaction channel; (6) social interactions of the customer; and (7) events of significance to the customer. The various types of data that may be received corresponding to each customer are explained in further detail with reference to an example representation in FIG. 3.

Figure 3:
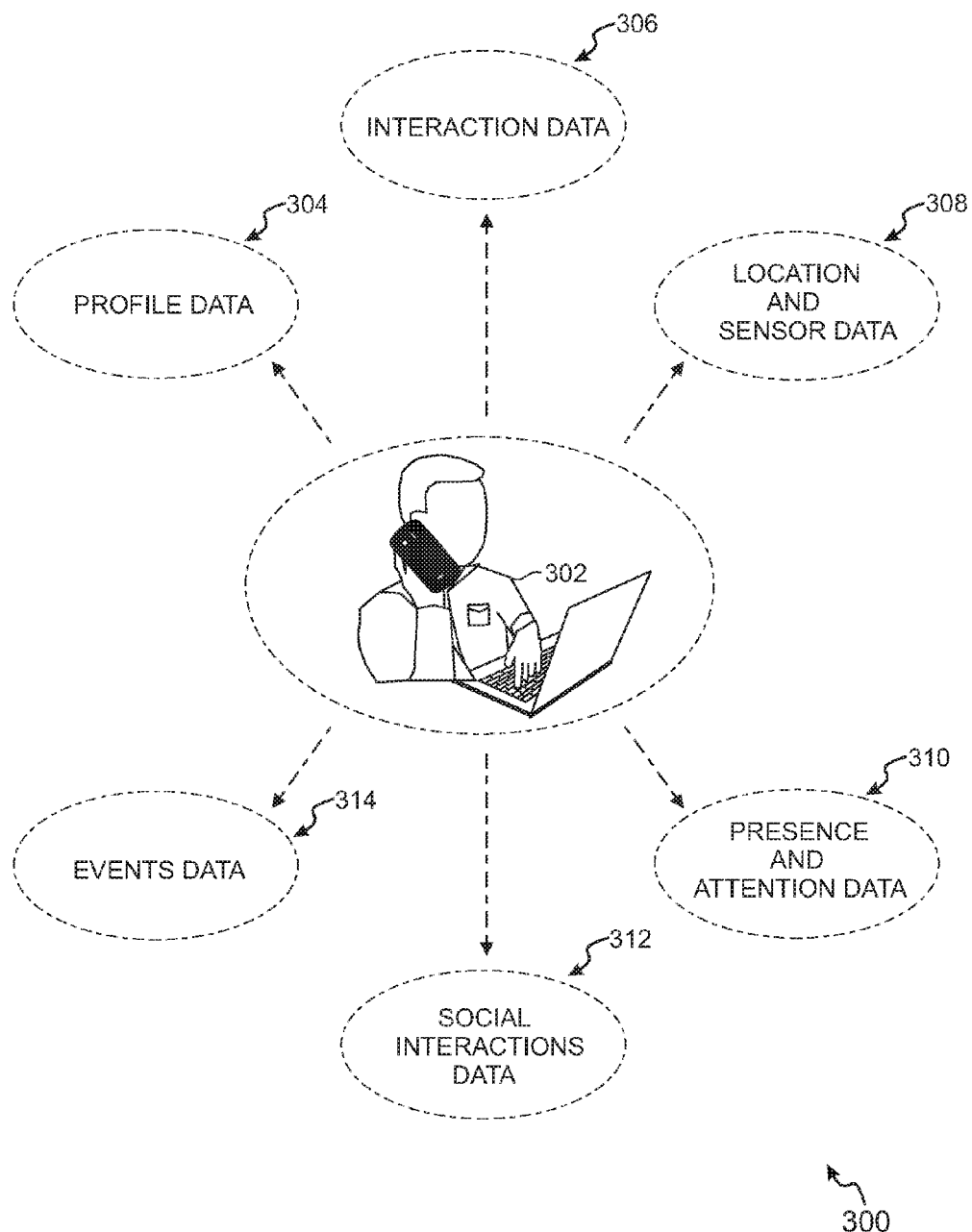
FIG. 3 shows an example representation for illustrating various types of data corresponding to a customer that may be received by the apparatus of FIG. 2, in accordance with an embodiment of the invention.

Referring now to FIG. 3, an example representation 300 is shown for illustrating various types of data corresponding to a customer 302 that may be received by the I/O module 206 of the apparatus 200, in accordance with an embodiment of the invention. In an example scenario, the customer 302 may wish to interact with an enterprise for a variety of purposes, such as for example, payment of a monthly bill, resolution of disputed transaction, cancellation of a reservation, enquiry of a newly launched product or a service and the like. Accordingly, the customer 302 may initiate one or more interactions with the enterprise. The interactions may be conducted using one or more electronic devices and over a variety of interaction channels, such as for example a speech or a voice channel (for example, phone call conversation with the customer service representative or the IVR system), a native mobile application, a web channel (a video call or through emails or online forms), a chat channel (for example, a chat with an customer service representative or an automated chat agent), and the like. Accordingly, a variety of information related to the customer 302 may be gathered and subsequently stored in the memory 204. Some of the information types related to the customer 302 that are stored in the memory 204 are depicted in example representation 300 as profile data 304, interaction data 306, location and sensor data 308, presence and attention data 310, social interactions data 312 and events data 314.

In at least one example embodiment, the profile data 304 includes information related to a profile of the customer 302, such as for example, a customer's name, contact details, personal and family information, banking account information, information related to products and services associated with the customer 302, messaging or sharing platforms used by the customer 302 and the like. The profile information may further include information related to customer interests and preferences, such as for example, the customer's device preferences and/or interaction channel preferences. In some example embodiments, the profile information may also include calendar information associated with the customer 302. For example, the calendar information may include information related to an availability of the customer 302 during the duration of a day/week/month.

In at least one example embodiment, the interaction data 306 includes information related to past interactions of the customer 302 with the resources of the enterprise, the types of channel used for interactions, types of customer issues involved, whether the issues were resolved or not, the frequency of interactions and the like. In an illustrative example, the data collated corresponding to an interaction of the customer 302 with an IVR resource of the enterprise may include information such as details of the customer's concern, IVR options selected, call transfer to an agent if any, time duration of the IVR interaction, etc. In another illustrative example, the data collated corresponding to a chat interaction of the customer 302 with a human agent of the enterprise may include information such as chat stages involved during the interaction, emotion scores associated with chat lines, concern resolution status, feedback received from the customer 302 and the agent, and the like. In another illustrative example, the data collated corresponding to the customer's visit to a website of the enterprise may include details of the customer's browsing pattern, frequency of visits, time spent on the web pages, images viewed, hyperlinks accessed, mouse roll over events and the like. Further, in some embodiments, the interaction data 306 collated corresponding to the customer 302 may also include the search terms entered by the customer 302 on an enterprise interaction channel or even on a search engine, advertisements presented to the customer 302 during a web journey, advertisements clicked or viewed by the customer 302 and the like. It is noted that the interaction data 306 may include information related to one or more interactions of the customer 302 with the enterprise conducted using multiple devices and/or multiple interaction channels.

In at least one example embodiment, the location and sensor data 308 may include information gleaned from geo-location tracking satellites and/or Wi-Fi sensors (in cars, stores and the like). Such information may include current and past geo-location information of the customer 302, for example, the places frequented by the customer 302, a current location the customer 302, and the like. In some embodiments, the location and sensor data 308 may also include data collated from sensors, such as sensors aiding authentication (for example, fingerprint/biometric sensors etc.) and/or from sensors capable of detecting movement (for example, accelerometer, gyroscope etc.), and the like.

The presence and attention data 310 corresponds to information related to customer's presence/attention in an interaction channel. In some embodiments, a presence of the customer 302 in one or more interaction channels may be actively tracked to determine the presence information related to the customer 302. In an illustrative example, the customer 302 may have logged in to one or more social networking media accounts, such as for example, in any of Facebook®, Twitter®, LinkedIn® and the like. Accordingly, a presence of the customer 302 in a social channel may be recorded as presence information. In another illustrative example, the customer 302 may be chatting with a friend using a chat application. In such a scenario, a presence of the customer 302 in the messaging channel may be detected and recorded as the presence information. In another illustrative example, if an instance of a customer browsing a website corresponding to the selected product/service is detected, then the presence of the customer in the web channel may be determined. In an embodiment, one or more tracking cookies may be configured to be included in a device browser/native device application associated with the customer device, which may enable detection of presence of the customer in an interaction channel.

Further, the I/O module 206 may also receive attention information indicative of customer's current attention. For example, even though the customer 302 has logged in one or more social media accounts, the customer 302 may be currently browsing some other website, then in such a scenario the attention information may be determined as the web channel (as opposed to a social channel as described above). In an embodiment, the presence and the attention data 310 may be utilized to determine the interaction mode in which the user is most active or most likely to be active. The presence and attention data 310 determined in such a manner may be utilized in a variety of ways. For example, if the presence and attention data 310 indicates that the customer 302 is currently present in a customer facility (or near to a customer facility), then this information of proximity of the customer 302 to a service location may be utilized in providing an enhanced customer service experience to the customer 302. In another illustrative example, if it is determined that the customer 302 is currently online (implying that the customer 302 is currently present/attentive in the web channel), then the customer 302 may be offered an interactive chat or a web-based call for providing assistance to the customer 302.

The social interactions data 312 may include information corresponding to customer's online networking accounts, recent posts or tweets and other such information related to customer's online conversations in the public domain. The events data 314 may include information related to events of significance to the customer 302. Some examples of the events of significance to the customer 302 may include personal events such as for example birthdays, festivals, anniversaries etc., and non-personal events such as for example billing cycle dates, weather related events, current and projected socio-political events, data outage events and the like.

As explained above, the received customer data may include various types of data corresponding to the customer 302 of the enterprise. It is understood that similar types of data may be received corresponding to other new and prospective customers of the enterprise, by the I/O module 206.

Referring now to FIG. 2, the processor 202 is configured to, with the content of the memory 204, cause the apparatus 200 to transform data corresponding to the each customer to generate suitable variables for enabling a prediction of one or more intentions of the customer. In an illustrative example, the location information of a customer (for example, the location and sensor data 308 as explained with reference to FIG. 3) may be transformed to derive variables related to how close the customer is to an enterprise location, does the customer travel a lot (derived from all location data elements), is the customer driving or is the customer indoors or outdoors, and the like. The presence and attention information may be similarly transformed to derive variables related to a frequency of visiting interaction channels, attention span of the customer for a particular visit, etc. In another illustrative example, social interactions data may be transformed to derive variables related to emerging topics regarding the industry or the enterprise in general, and these topics may thereafter be classified with similar topics from the past. In at least one example embodiment, the processor 202 may be configured to assign weights to the variables such that possibility of error during prediction is minimized and/or likelihood of prediction being right is maximized.

In an embodiment, the processor 202 is configured to, with the content of the memory 204, cause the apparatus 200 to predict at least one intention for each customer of the enterprise. More specifically, the processor 202 may predict at least one intention for each customer by using respective data of the customer from among the customer data stored in the memory 204. More specifically, the processor 202 may be configured to subject the variables derived from the data corresponding to the each customer to a set of structured and un-structured data analytical models including text mining & predictive models for customer intention prediction purposes. Examples of the prediction models may include, but are not limited to Logistic regression, Naïve Bayesian, Rule Engines, Neural Networks, Decision Trees, Support Vector Machines, k-nearest neighbor, K-means and the like. In an example embodiment, all the variables derived from the profile data, the interaction data, the location and sensor data, the attention and presence data, the events data, the social interactions data and the like, corresponding to the customer may be classified into a several columns and fed to one or more prediction models to predict intention(s) of a customer. In an illustrative example, the prediction models may predict that the customer may make a purchase on a subsequent visit to the website or not. In another illustrative example, the prediction models may predict that a customer may return a product to the retail outlet of the enterprise within a week's time frame. In yet another illustrative example, the prediction models may predict that the customer plans a leisure trip and may make travel arrangements as well as purchase travel insurance. In at least one embodiment, the prediction of one or more intentions for each customer of an enterprise may result in a finite set of overall intentions for customers of the enterprise. The finite set of intentions is referred to hereinafter as a plurality of intentions.

In an embodiment, the processor 202 is configured to, with the content of the memory 204, cause the apparatus 200 to determine, for each customer, a likelihood of a customer initiating an interaction with the enterprise for the respective predicted intention. More specifically, upon determining one or more intentions of the customers, the processor 202 is caused to determine, if the customers would need assistance for their respective predicted intentions. If it is determined that a customer may need assistance for the respective predicted intention, then the apparatus 200 is caused to predict a likelihood of the customer initiating an interaction with the enterprise. In an illustrative scenario, upon determining that the customer intends to purchase a product or avail a service, the processor 202 may be configured to determine a likelihood of the customer requiring assistance for such an intention. The likelihood may be measured on a scale, such as for example—a scale with 'very high', 'high', 'average', 'low' and 'very low' gradations, or, alternatively, likelihood may be quantified by a numerical value on a scale ranging from 0 to 1. For example, the processor 202 may predict that a likelihood of the customer purchasing the product or availing the service within next two months is 0.95, indicating a 95% probability of occurrence of such an event. In some example scenarios, the processor 202 may predict that the customer may not be interested in purchasing the product or availing the service, in which case, the likelihood of the customer initiating an interaction with the enterprise may be low or zero.

In at least one example embodiment, the processor 202 is configured to determine if the predicted likelihood is greater than a predefined threshold value. In an illustrative example, the predefined threshold value may be an empirically chosen value or a value chosen based on manual observations of effects of choosing various predefined threshold values on predicted and actual customer behaviour. In an illustrative example, the predefined threshold value may be a number chosen on a numerical scale ranging from 0 to 1. For example, the predefined threshold value may be 0.75 (indicating a 75% probability of the customer initiating an interaction with the customer for the respective intention). Accordingly, if it is determined that a customer needs assistance for respective predicted intention and a likelihood of the customer initiating an interaction with the enterprise is 0.2 (i.e. 20% probability), then the processor 202 may be configured to determine that the likelihood of the customer initiating an interaction with the enterprise for the respective predicted intention does not exceed a pre-defined threshold value. It is noted different threshold values may be chosen (i.e. predefined) for different time periods. For example, a predefined threshold value chosen for a weekday in the month of October may be different than the predefined threshold value chosen for a weekday in the last week of December. Moreover, it is understood that the predefined threshold values, in some cases, may be dynamically updated based on observed feedback results or even on perceived changes in expected volumes of interactions.

In an embodiment, the processor 202 is configured to, with the content of the memory 204, cause the apparatus 200 to predict a time of interaction for one or more customers for whom it is determined that the likelihood of initiating the interaction with the enterprise exceeds the pre-defined threshold value. More specifically, the processor 202 is caused to determine when the customer would need assistance (or when the customer interaction is expected). For example, if it is known that the customer is scheduled to take flight services in a week's time (for example, such information may be obtained from a customer's calendar information), then the processor 202 may predict an intention of the customer to know an on-time status of the flight. For such predicted intention, the processor 202 may determine a likelihood of the customer initiating an interaction with the enterprise. In an example scenario, using the various prediction models, the processor 202 may determine that the customer may require assistance in this regard. In such a scenario, the processor 202 may determine if a likelihood of the customer to initiate an interaction with the enterprise is greater than a predefined threshold value. If the determined likelihood is greater than the predefined threshold value, then the processor 202 may determine a probable time the customer may seek assistance. For example, the processor 202 may determine that the customer may call (i.e. use a voice channel) to inquire the flight's on-time status on the day of departure. In some embodiments, the processor 202 may predict intentions of the customers on a larger time scale, such as for example a month or a week's duration. However, if it is determined that the customer may seek interaction within a shorter time duration, such as in a few days time, then the processor 202 may be configured to predict the expected time of interaction at a granular level, such as for example, the probable day or the probable hour, at which the customer may seek assistance.

In at least one example embodiment, the processor 202 may further be configured to predict what interaction channel may be preferred by the customer for the predicted interaction. In an example embodiment, the prediction of an interaction channel may be made based on the historical data such as a customer's channel affinity (i.e. historical customer channel preferences), location and sensor data, presence and attention data associated with the customer, customer's profile information and the like. Some non-limiting examples of interaction channels may include a chat interaction channel, a voice interaction channel, a video interaction channel, a web channel, a physical visit and the like.

In an embodiment, the processor 202 is configured to, with the content of the memory 204, cause the apparatus 200 to estimate an expected volume of interactions for at least one time period based on the plurality of intentions. For example, the processor 202 may be configured to estimate an expected volume of interactions for one or more time periods (for example, time periods such as forthcoming week, a specific month or even next work shift). To that effect, the processor 202 may be configured to compute an expected volume of interactions in a chosen time period for existing customers and for new customers and for several customer intentions.

In an embodiment, the expected volume of interactions from existing customers within a given time period may be computed by adding probabilities corresponding to predicted customer interactions for each of the several customer intentions. For example, those customers for whom, a likelihood of interaction for a specific customer intention is greater than a predefined threshold value (for example, a value of 0.5 implying that there is 50% probability that the customer may call for the specific intention in that time period), then such customers may together constitute the interaction volume of existing customers for that specific intention and time period. Accordingly, the processor 202 may be configured to aggregate number of interactions that are predicted to take place within the chosen time period for the existing customers for the several customer intentions to configure expected volume of interactions from the existing customers.

In an embodiment, an expected volume of interactions for new or prospective customers for various time periods may be estimated by the processor 202 using traditional techniques enhanced with interaction volumes observed across clients and channels. Some non-exhaustive examples of the traditional techniques may include predictions based on a general pattern of the customer interactions at a customer support facility as well as on specific patterns of the customer interactions on specific time slots such as, on Monday or on an evening prior to a major holiday etc. Further, the processor 202 may estimate an expected volume of interactions for new or prospective customers for various time periods by using data from social feeds and other sources, which provide indications of possible interaction from the new customers. Some examples of the social feeds and other sources may include online information through social networking websites, online forums, chat groups, blogs and the like. Furthermore, the processor 202 may estimate an expected volume of interactions for new or prospective customers for various time periods by using estimates from existing customers to predict fluctuations in volumes of new customers. For example, historical data associated with the existing customers may be used to predict the interaction volume for the new customers.

In an embodiment, the processor 202 may be configured to aggregate number of interactions from existing customers and new customers for one or more time periods for several customer intentions to estimate an expected volume of interactions for those respective time periods.

In some example embodiments, the apparatus 200 may be caused to define a hierarchical framework whereby a plurality of customer intentions for contacting the customer support facility may first be identified and classified into broad categories, such as for example, information request, concern resolution, bill payment, change of profile information and the like. The customer intentions for existing and new customers may then be predicted and classified into one or more intention categories. For a given intention, when an existing/new customer would seek assistance may then be predicted and accordingly an expected interaction volume for various time periods may be determined. In an example embodiment, the time scales may be gradually made granular from monthly basis to weekly basis, daily basis and then hourly basis. An example plot illustrating fluctuations in expected volume of interactions over a plurality of days in a week for chosen customer intention is depicted in FIG. 4.

Figure 4:
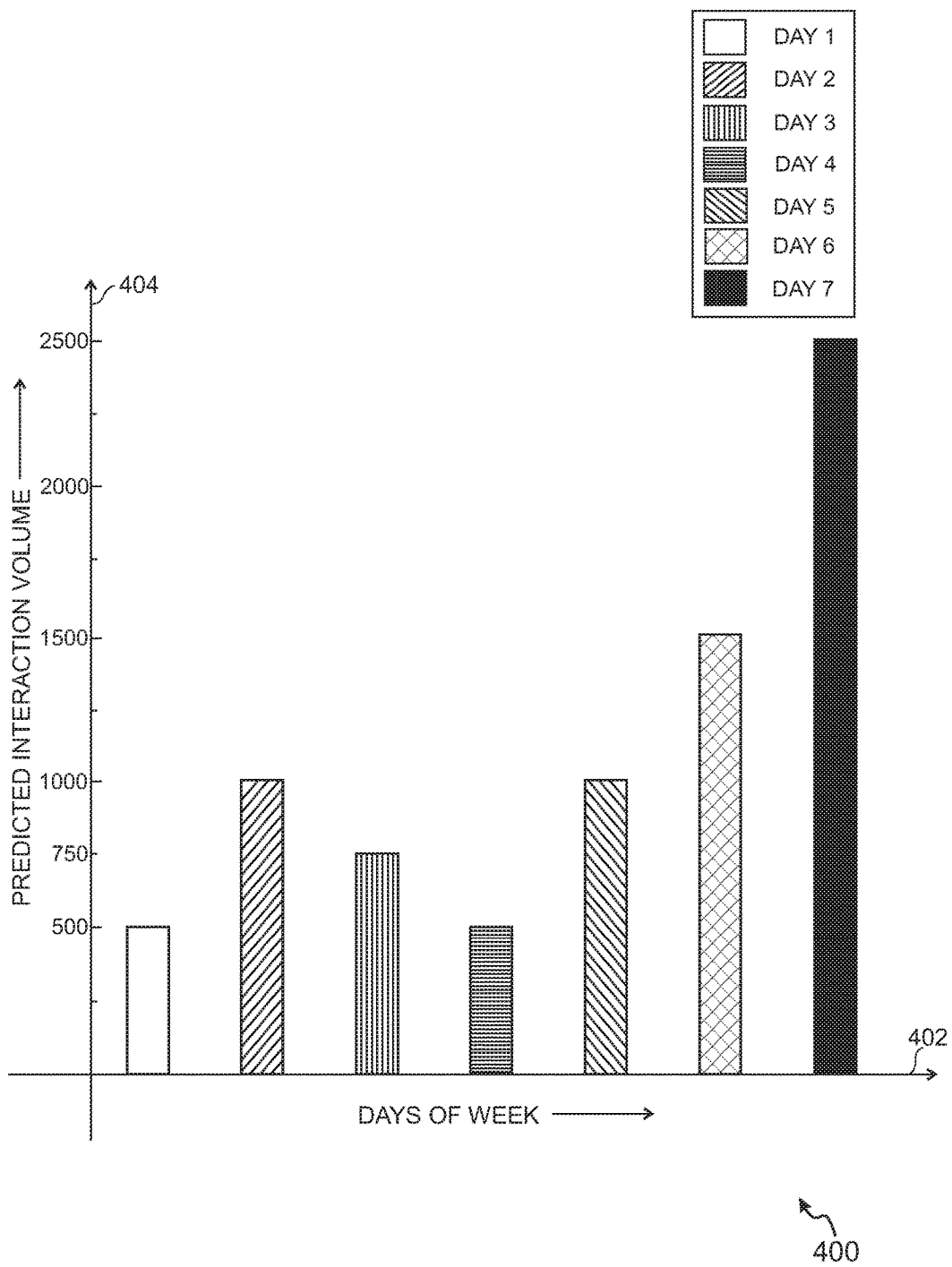
FIG. 4 shows an example plot illustrating fluctuations in estimated expected volume of interactions for days of a week for a chosen customer intention, in accordance with an embodiment of the invention.

Referring now to FIG. 4, an example plot 400 illustrating fluctuations in estimated expected volume of interactions for days of a week for a chosen customer intention is shown in accordance with an embodiment of the invention. The chosen customer intention may be one from among several customer intentions that customers typically seek assistance for, from the resources in the customer support facility. For example, existing and new customers may contact the customer support facility for payment of a bill for monthly cellular services availed by them. For such a 'bill payment' customer intention, interaction volumes may be predicted for a chosen time scale, such as a quarter, a month, a week, a day or even on hourly basis. The expected volume of interactions may then be estimated as explained above, i.e. by aggregating number of interactions for existing customers and new customers for several customer intentions and for a given time period.

Accordingly, FIG. 4 depicts the plot 400 with the X-axis 402 corresponding to the days of a week and the Y-axis 404 corresponding to the predicted interaction volumes for a chosen intention. As can be seen from the plot 400, for the chosen intention, 500 customers would seek interaction on day 1 of the week, 1000 customers on day 2, 750 customers on day 3, 500 customers on day 4, 1000 customers on day 5, 1500 customers on day 6 and 2500 customers on day 7. It is noted that the plot 400 is included herein for illustration purposes and various example representations of estimated volume of interactions, may be generated to visualize fluctuation in number of customer interactions over various time frames.

In at least one example embodiment, each interaction in the expected volume of interactions may be associated with one or more interaction attributes. For example, an attribute associated with an expected interaction may refer to an intention of a customer seeking the interaction. For example, a customer may seek assistance with a resource of an enterprise to seek a refund on a prior product purchase. Information related to such a predicted intention of the customer may configure an attribute of the expected interaction.

In another illustrative example, an attribute associated with an expected interaction may be priority level associated with the interaction. For instance, it may be predicted that the customer will call in next hour upon detecting a fraudulent transaction on his card. Such an expected interaction may be associated with higher priority than other expected interactions. Information related to a priority level (for example, high, low or medium priority) of the customer may configure another attribute of the expected interaction.

In yet another illustrative example, an attribute associated with an expected interaction may be a customer lifetime value (CLV) of the customer. For example, a customer who frequently uses enterprise products or avails services of the customer may be associated with a high CLV. Information related to a priority of the customer (for example, high, low or medium CLV) may configure another attribute of the expected interaction.

Accordingly, each interaction in the expected volume of interactions may be associated with one or more interaction attributes.

Referring now to FIG. 2, in at least one embodiment, the processor 202 is configured to, with the content of the memory 204, cause the apparatus 200 to receive resource data corresponding to a plurality of resources of the enterprise. More specifically, the I/O module 206 of the apparatus 200 may be configured to receive the resource data, i.e. aggregated data corresponding to the resources of the enterprise. As explained, the term 'resources' implies both human resources as well as machine-based resources of the enterprise. The resource data may be received from customer support facilities, such as the customer support facility 104 explained with reference to FIG. 1, and/or, remote data gathering servers, which are configured to track activity of the resources, such as human agents of the enterprise.

In an embodiment, the resource data includes data corresponding to the each resource of the enterprise. In an embodiment, the data corresponding to each resource may include information related to at least one of a type of a resource (for example, a human resource or machine-based resource, a voice agent or a chat agent, and the like) an identification of the resource (for example, an agent identification number or a machine identification number), a service level agreement associated with the resource (for example, an agreement including information related to working hours, weekly day offs, shift information etc.) and a performance history of the resource (for example, a number of interactions historically handled by the resource, call transfers if any, concern resolution status of the handled interactions and the like).

In an embodiment, each resource is associated with a plurality of resource attributes. For example, an attribute associated with a resource may relate to a skill of the resource. In an illustrative example, a voice agent may be skilled in assisting customers with opening a new account for financial transactions. In another illustrative example, a chat agent may be skilled in assisting customers with completing a purchase on the website. In yet another example, a human agent may be an expert in handling high priority interactions or dealing with customers with high CLU. The information related to skill and/or area of expertise of a resource may configure an attribute of the resource.

In another example, an attribute associated with a resource may relate to a capability of the resource. For example, one human agent may handle five different interactions in an hour, whereas another human agent may handle eight different interactions in an hour's time. In another example, a human agent may handle both online and offline interactions, simultaneously. For example, the human agent may engage in live chat with two or more customers and also send email reminders to other customers in an offline manner. The resource attribute may capture information related to such a capability of the resource. In case of machine-based resource, such as a web server, a server capacity or a bandwidth associated with a communication channel may define capabilities of respective machine-based resources. In another illustrative example, an attribute associated with a resource may relate to an availability status of the resource. For example, in case of human resources, the attribute capturing an availability of the resource may include information such as whether a resource is currently free to handle an interaction or can a resource handle interactions during morning sessions next week, etc. In case of machine-based resources, the attribute capturing an availability of the resource may include information such as available bandwidth, available storage space and the like.

In an embodiment, the processor 202 is configured to, with the content of the memory 204, cause the apparatus 200 to map at least one resource to each interaction in the expected volume of interactions. The at least one resource may be mapped to each interaction based on a match between respective resource attributes associated with the at least one resource and the one or more interaction attributes associated with the each interaction. More specifically, the processor 202 may be configured to compare resource attributes of various resources with interaction attributes of expected interactions for identifying matches between the resource attributes and the interaction attributes. In an illustrative example, the processor 202 may be configured to compare skills of human resources with requirements of interactions (for example, priority of interaction or intention associated with the interaction) to identify possible matches there between. Upon identification of a match, the processor 202 may be configured to match a resource to the corresponding interaction. The term 'map' or 'mapping' as used herein refers to loose association of a resource to an interaction such that if the interaction is initiated by the customer as expected, then the resource may be entrusted with handling the interaction so as to assist the customer with the customer's concern. In at least one example embodiment, skills of agents are matched with requirements of an interaction (i.e. interaction attributes related to intention of the customer as well as priority of the interaction) so as to map agents to interactions. In an illustrative example, an interaction attribute may indicate that the interaction is associated with high priority and relates to a resolution of complaint over unreliable data services by a mobile provider. In such a case, an agent who is an expert in resolution of complaints and who has experience in dealing with high priority interactions, or in other words, whose attributes match the requirement of the interaction, may be mapped to the interaction. The mapping of resources to expected interactions is further explained with reference to FIG. 5.

Figure 5:
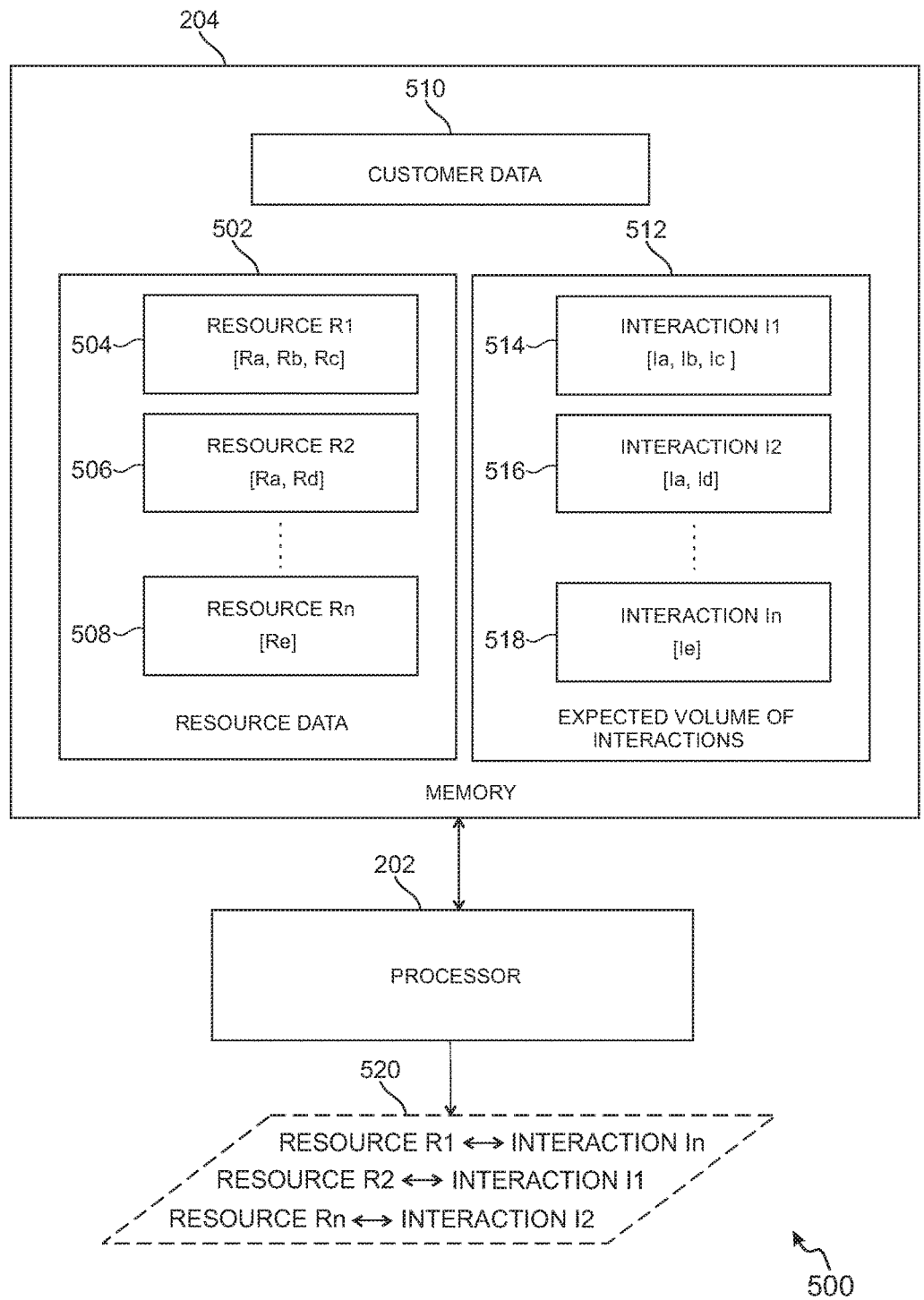
FIG. 5 is a block diagram showing a mapping of resources to expected interactions, in accordance with an embodiment of the invention.

FIG. 5 is a block diagram 500 showing a mapping of resources to expected interactions, in accordance with an embodiment of the invention. As explained with reference to FIGS. 2 to 4, the I/O module 206 (not shown in FIG. 5) of the apparatus 200 is configured to receive resource data comprising data corresponding to a plurality of resources. The plurality of resources includes human and machine-based resources of an enterprise. Each resource is further associated with a plurality of resource attributes. The received resource data is further stored in the memory 204 of the apparatus 200 as depicted in FIG. 5. Accordingly, in the block diagram 500 in FIG. 5, the memory 204 of the apparatus 200 is depicted to store resource data 502 including data corresponding to a plurality of resources such as resources 504, 506 and 508 (exemplarily depicted to be resources 'R$_1$', 'R$_2$' and 'R$_n$' in FIG. 5). Each resource is further associated with one or more resource attributes. For example resource 504 (i.e. resource R$_1$) is associated with resource attributes R$_a$, R$_b$ and R$_c$; resource 506 (i.e. resource R$_2$) is associated with resource attributes R$_a$ and R$_d$; and resource 508 (i.e. resource R$_n$) is associated with resource attribute R$_e$.

Further, as explained with reference to FIGS. 2 to 4, the I/O module 206 of the apparatus 200 is configured to receive customer data corresponding to a plurality of customers of the enterprise and store the customer data in the memory 204. Accordingly, the block diagram 500 depicts customer data 510 stored in the memory 204 of the apparatus 200. Further, as explained with reference to FIGS. 2 to 4, the processor 202 is configured to predict at least one intention for each customer and thereafter predict an expected time of interaction for each customer. The processor 202 is further configured to estimate an expected volume of interactions for one or more time periods based on the predicted time of interactions. An expected volume of interactions for a chosen time period is exemplarily depicted using block 512 in FIG. 5. More specifically, the expected volume of interactions includes a plurality of interactions, such as interactions 514, 516 and 518 (exemplarily depicted to be interaction 'I$_1$', 'I$_2$' and 'I$_3$' in FIG. 5). Each interaction is further associated with one or more interaction attributes. For example interaction 514 (i.e. interaction I$_1$) is associated with interaction attributes I$_a$, I$_b$ and I$_c$; interaction 516 (i.e. interaction I$_2$) is associated with interaction attributes I$_a$ and I$_d$; and interaction 518 (i.e. interaction I$_n$) is associated with interaction attribute I$_e$.

As explained with reference to FIG. 2, the processor 202 is configured to compare resource attributes of various resources with interaction attributes of expected interactions to identify matches and map one or more resources to an interaction based on the identified matches. More specifically, the processor 202 may match resource attributes R$_a$, R$_b$, R$_c$, R$_d$ and R$_e$ with interaction attributes I$_a$, I$_b$, I$_c$, I$_d$ and I$_e$. In an illustrative example, the processor 202 may deem resource attribute R$_e$ (for example, a particular skill of a resource) to be a good match with an interaction attribute I$_d$ (for example, a specific intention associated with the interaction). Accordingly, the processor 202 may map resource 508 (i.e. resource R$_n$) to the interaction I$_2$. Similarly, the processor 202 may map resources 504 and 506 to interactions I$_n$ and I$_1$, respectively, as exemplarily depicted in a block 520 depicting resource to interaction mapping.

Referring now to FIG. 2, in at least one embodiment, the processor 202 is configured to, with the content of the memory 204, cause the apparatus 200 to facilitate a staffing of the plurality of resources of the enterprise based, at least in part, on the mapping of the at least one resource to the each interaction. More specifically, the apparatus 200 is caused to facilitate a management of deployment of resources for a given time period and for a given customer intention based on the resource to interaction mapping provided by the apparatus 200 as explained with reference to FIG. 5. In some embodiments, the apparatus 200 is further caused to determine which customer intention or which set of customers to give priority to and which resource to be assigned to which intention based on resource skill level and interaction priority. In an embodiment, the apparatus 200 is caused to perform resource to interaction mapping for facilitating staffing of resources at regular intervals (for example, every week) and dynamically adjust staffing requirements for changing interaction/intention queue traffics.

In some example scenarios, the apparatus 200 includes the flexibility to facilitate dynamic changing of staffing requirements for next instance, where the term 'instance' may refer to a particular work shift or even a time period, such as on an hourly basis, whereas, in cases of non-human resources, the term 'instance' may refer to near real-time instances.

Moreover as explained above, the apparatus 200 is caused to facilitate assignment of the right resource/agent to each customer based on skill and priority of the interaction. Further, staffing of resources may also take into account the priority levels of the customers, for example, appropriate staffing may be predicted for preferred customers. In some scenarios, deploying of resources may be delayed because higher priority customers may be expected to initiate interaction in an hour's time.

In some example embodiments, the processor 202 may be configured to only partially utilize the resource to interaction mapping and instead facilitate proactive initiation of interactions with some customers (for whom it is determined that the likelihood of initiating the interaction with the enterprise exceeds the pre-defined threshold value) using most suitable among available agents. For example, if a likelihood of a customer initiating an interaction is greater than a pre-defined threshold value of 0.9 (implying 90% probability that the customer will initiate an interaction with the customer during a given time frame, for example, a week's time), then the apparatus 200 may be caused to facilitate proactive reaching out to the customer. For example, if a fraudulent transaction is detected, then the processor 202 may be configured to facilitate proactive outbound call to the customer as there is a high likelihood that the customer may contact the enterprise. In such a case, the resource to interaction mapping for the customer may serve as a guide to select the next best suitable agent if the mapped agent is not available for the interaction.

In some example embodiments, if one or more customers with high likelihood of initiating interactions with the enterprise are predicted to contact the enterprise in a time period, which is associated with a volume of expected interactions greater than a prescribed limit, then such customers may be proactively contacted prior to their predicted time of interaction. For example, if the expected volume of interactions for a chosen time slot is greater than 500 interactions, which is the prescribed limit for a number of interactions that can be adequately handled in a given time slot, then one or more customers with high likelihood of contacting the enterprise may be contacted prior in a time slot prior to the predicted time slot. In some example scenarios, the proactive reaching out to customers may be initiated in time periods associated with lesser expected volume of interactions.

In some embodiments, the processor 202 is caused to factor in customer lifetime value of the customer prior to initiating outbound contact. Alternatively or additionally, self serving solutions, such as widgets, dynamic uniform resource locators, dynamic IVR messages, and the like may be utilized to interact with customers. Further, emails or SMS may be sent to the customers to provide them with information and avoid their seeking out help from the customer support facility. In some scenarios, the nature of interaction assistance may also be personalized for a customer segment as well as for a specific customer need.

In at least one example embodiment, the I/O module 206 of the apparatus 200 may be caused to receive tracked activity of a customer on an interaction channel. The tracked activity may correspond to an on-going customer journey on an interaction channel. In such a scenario, the processor 202 may be configured to determine, in real-time, if the customer requires interaction assistance based on the tracked activity. More specifically, the processor 202 may predict an intention of the customer based on information related to customer's journey on the interaction channel so far, and, past interaction history of the customer. Further, the processor 202 may determine if the customer needs assistance based on the predicted intention. The processor 202 may also determine if a request for interaction is to be proactively offered to the customer on the interaction channel upon determining that the customer requires interaction assistance. Such a determination for proactively offering the request for interaction may be performed based, at least in part, on a current staffing of the plurality of resources and a customer lifetime value (CLU) of the customer. The proactive offering of interaction assistance to a customer is further explained with reference to an illustrative example in FIG. 6.

Figure 6:
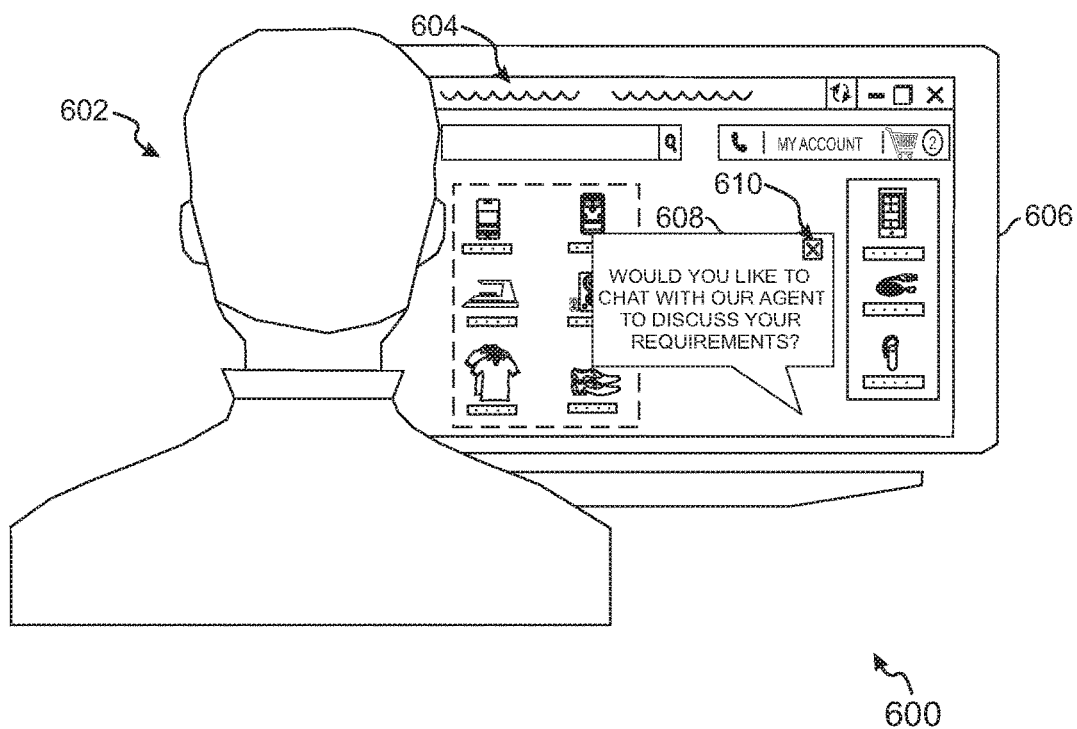
FIG. 6 shows an example representation for illustrating a provisioning of a request for interaction to a customer during an on-going journey on an enterprise interaction channel, in accordance with an embodiment of the invention.

Referring now to FIG. 6, an example representation 600 is shown for illustrating a provisioning of a request for interaction to a customer 602 during an on-going journey on an enterprise interaction channel, in accordance with an embodiment of the invention. More specifically, the customer 602 may access an enterprise website (i.e. visit a web interaction channel corresponding to the enterprise) by using a web browser application 604 included in a customer's device 606. It is understood that the website may be hosted on a remote server and the web browser application 604 may be configured to retrieve one or more web pages of the enterprise website over a network, such as the network 120 explained with reference to FIG. 1.

One or more remote data gathering servers (not shown in FIG. 6) may be configured to track the customer's activity on the enterprise website. For example, tracking customer's activity on the enterprise website may include tracking a sequence of web pages visited, time spent on each web page, images clicked, hyper links accessed etc., and such information may be provided to the I/O module 206 of the apparatus 200 explained with reference to FIG. 2, in substantially real-time. Further, the processor 202 of the apparatus 200 may predict customer's intention and may determine if the customer 602 needs interaction assistance for the predicted intention or not. For example, in an illustrative scenario, the customer 602 may have visited the FAQ web page associated with the enterprise website and/or searched for links related to booking reservations. In such a scenario, based on the tracked activity of the customer 602 on the enterprise website, the processor 202 may predict that the customer 602 intends to cancel a recently booked travel reservation. The processor 202 may further determine that the customer 602 needs assistance for the predicted intention as the customer 602 seems to have continued his search for a satisfactory resolution to his concern. For example, the processor 202 may also be configured to predict, at regular intervals (for example, five second intervals) how likely the customer 602 is to interact.

As explained above, the apparatus 200 may further be caused to determine if a request for interaction is to be proactively offered to the customer 602 on the enterprise website upon determining that the customer 602 requires interaction assistance. For example, the processor 202 may be configured to predict a benefit of offering chat assistance to the customer 602 (whether the assistance may result in sale or enhance a customer experience) as opposed to not offering chat assistance to the customer 602. The processor 202 may also check a current staffing of the resources to determine how many resources may be able to chat with the said customer 602. Given the availability of resources, the processor 202 may determine a score based on predictions related to how likely the customer 602 is to seek assistance and the benefit of offering assistance to a customer likely to interact. Only when the score is greater than a pre-determined value (for example a numerical value chosen empirically, such as 0.5 for instance), the chat assistance may be proactively offered to the customer 602. In some embodiments, a customer lifetime value (CLU) of the customer 602 may also be accounted for, during determination of offering of interaction assistance to the customer 602.

In some embodiments, the processor 202 may be configured to determine an appropriate time for proactively offering the request for interaction to the customer 602 on the interaction channel. In an embodiment, the appropriate time may be determined based on determining a likelihood of a desired outcome to be greater than a pre-determined value. For example, upon $n^{th}$ web page load, if it is determined that the likelihood of the customer 602 purchasing a product is greater than a pre-determined value (for example, if there is more than 50% probability of the customer making a purchase for the current visit to the website), then the processor 202 may be configured to proactively offer the request for interaction as soon as the likelihood exceeds the pre-determined value, i.e. on the $n^{th}$ web page visited on the enterprise website.

Accordingly, a pop-up window 608 may be displayed on the web page. The pop-up window 608 may include text, such as 'Would you like to chat with our agent to discuss your requirements?' to facilitate provisioning of the request for invitation (for example, a chat interaction) to the customer 602. The customer 602 may choose to provide his/her acceptance by clicking on the pop-up window 608. Alternatively, the customer 602 may decline the interaction invitation may clicking on 'close' icon 610 on the pop-up window 608. The customer 602 may also choose to ignore the interaction invitation.

In some embodiments, the processor 202 is configured to determine whether a customer needs assistance and once it is determined that the customer needs assistance, then the processor 202 is further configured to determine if it is optimal to offer assistance to the customer now or a later time period. In another illustrative example, chat assistance may be offered to a customer when it is determined that the customer is currently present/attentive on the web channel (or via native app) at the right time by anticipating that a customer needs specific assistance.

Such proactive assistance offered to the customer provides several advantages as the assistance may be provided while taking into account a number of factors, such as (1) whether an agent is available; (2) Whether the customer needs help; (3) whether there are more customers who need help and are they more important than this customer; (4) whether the customer can wait for few more minutes till another agent is free, and the like.

Referring now to FIG. 2, in an embodiment, the apparatus 200 is also associated with a feedback loop, where predicted interaction volumes for various time periods are matched with corresponding actual observed interaction volumes (including both inbound and outbound/proactive interactions) and appropriate adjustments to prediction models and/or resource-to-interaction mapping algorithms are performed to further reduce instances of inappropriate staffing.

In at least one example embodiment, the processor 202 is further configured to predict customer intentions at regular intervals (for example, every week), and adjust the estimates of expected volume of interactions dynamically with changing interaction traffic and as per the manual observational data.

Furthermore, the processor 202 may be configured to make various assumptions for facilitating predictions. For instance, the processor 202 may be configured to assume that a customer may call after a failed transition, or after a flight cancellation to change hotel and transport reservations, or in scenarios when a customer's discount period is about to expire, or when the customer is delayed in traffic on way to airport, or to ask for an upgrade upon receiving news of a new product launch and the like. Similarly, it may be assumed that a customer may call regarding insurance immediately, when the customers' vehicle has been involved in an accident. In some embodiments, it may be assumed that the customer may call within a day upon expressing interest for a specific product and/or browsing for related information.

In an embodiment, the processor 202 may also detect occurrence of at least one event indicating a change in expected volume of interactions and may cause the apparatus 200 to facilitate dynamic adjustment (almost in real-time) to staffing of one or more resources from among the plurality of resources of the enterprise for at least one forthcoming time period (such as for example, a next hour or a next work shift). Some non-exhaustive examples of such events may include (1) enterprise triggered events such as for example, change in policies, campaigns, new product launches, and the like; (2) customer lifecycle events such as for example, bill generation, fraudulent transaction, delay in shipment, and the like; and (3) external events such as for example, extreme weather, government policies, rare events such as outages, data breach, major competitor/affiliate activities, activities of others within network, such as for example influential posts on social networking websites and the like. In some embodiments, the dynamic adjustment to staffing of resources may also be facilitated using location triggers, such as for example location of customers obtained from geo-location tracking satellites and/or one or more sensors installed in stores, vehicles, and the like. A method for facilitating staffing of resources is explained with reference to FIG. 7.

Figure 7:
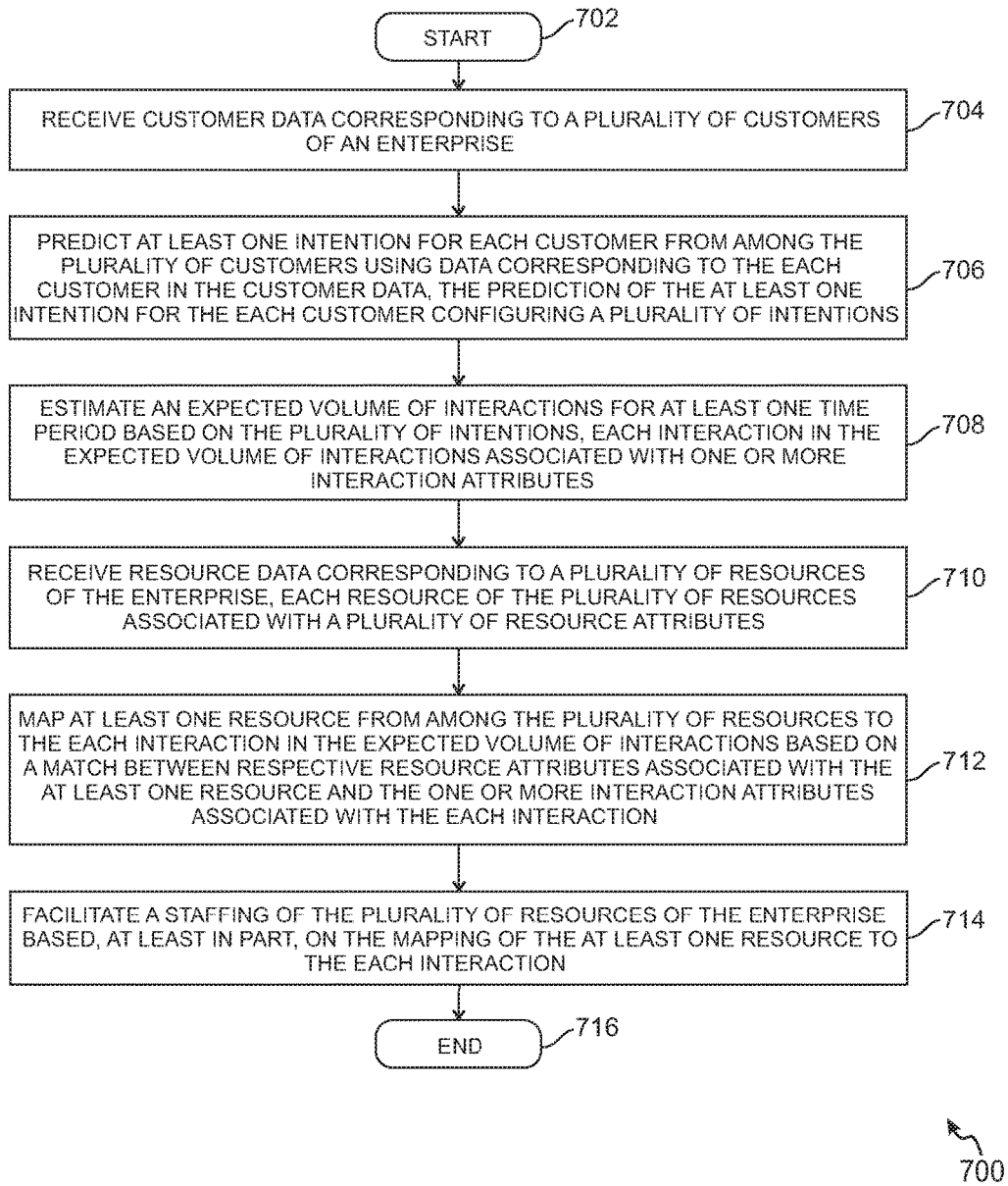
FIG. 7 is a flow diagram of an example method for facilitating staffing of resources, in accordance with an embodiment of the invention.

FIG. 7 is a flow diagram of an example method 700 for facilitating staffing of resources, in accordance with an embodiment of the invention. The method 700 depicted in the flow diagram may be executed by, for example, the apparatus 200 explained with reference to FIGS. 2 to 6. Operations of the flowchart, and combinations of operation in the flowchart, may be implemented by, for example, hardware, firmware, a processor, circuitry and/or a different device associated with the execution of software that includes one or more computer program instructions. The operations of the method 700 are described herein with help of the apparatus 200. For example, one or more operations corresponding to the method 700 may be executed by a processor, such as the processor 202 of the apparatus 200. It is noted that although the one or more operations are explained herein to be executed by the processor alone, it is understood that the processor is associated with a memory, such as the memory 204 of the apparatus 200, which is configured to store machine executable instructions for facilitating the execution of the one or more operations. It is also noted that, the operations of the method 700 can be described and/or practiced by using an apparatus other than the apparatus 200. The method 700 starts at operation 702.

At operation 704 of the method 700, customer data corresponding to a plurality of customers of an enterprise is received. The data received corresponding to each customer may include customer profile data, interaction data, location and sensor data, presence and attention data, social interactions data and events data as explained with reference to customer 302 in FIG. 3.

At operation 706 of the method 700, at least one intention is predicted for each customer from among the plurality of customers using data corresponding to the each customer in the customer data. More specifically, the data corresponding to each customer is transformed into variables, assigned weights, and is subjected to a set of structured and unstructured data analytical models including text mining & predictive models for customer intention prediction purposes. Examples of the prediction models may include, but are not limited to Logistic regression, Naïve Bayesian, Rule Engines, Neural Networks, Decision Trees, Support Vector Machines, k-nearest neighbor, K-means and the like. Further, the weights of variables and the prediction models may be learnt/adjusted using a feedback loop, wherein outcomes of the predictions are received at a later stage and the weights/prediction models dynamically adjusted to account for observed errors. The prediction of the at least one intention for the each customer configures a plurality of intentions.

At operation 708 of the method 700, an expected volume of interactions is estimated for at least one time period based on the plurality of intentions. The estimation of the expected volume of interactions for one or more time periods may be performed as explained with reference to FIG. 2 and is not explained again herein. Further, each interaction in the expected volume of interactions may be associated with interaction attributes relating to at least one of an intention of a customer seeking the interaction, a priority level of the customer and a CLU of the customer.

At operation 710 of the method 700, resource data corresponding to a plurality of resources of the enterprise is received. The plurality of resources may include human resources and machine based resources. Each resource is associated with a plurality of resource attributes, such as those related to a skill of a resource, a capability of the resource and an availability status of the resource and the like.

At operation 712 of the method 700, at least one resource from among the plurality of resources is mapped to each interaction in the expected volume of interactions based on a match between respective resource attributes associated with the at least one resource and the one or more interaction attributes associated with the each interaction. The mapping of resources to interactions may be performed as explained with reference to FIG. 5 and is not explained herein.

At operation 714 of the method 700, a staffing of the plurality of resources of the enterprise is facilitated based, at least in part, on the mapping of the at least one resource to the each interaction. More specifically, a management of deployment of resources for a given time period and for a given customer intention is facilitated based on the resource to interaction mapping. Further, an assignment of the right resource/agent to each customer based on skill and priority of the interaction is also facilitated. Further, staffing of resources may also take into account the priority levels of the customers, for example, appropriate staffing may be predicted for preferred customers. In some embodiments, dynamic changing of staffing requirements for next instance is also facilitated as explained with reference to FIG. 2.

The method 700 ends at operation 716. At operation 716, an enterprise user may manage staffing of the plurality of resources based on the resource to interaction mapping as well as suggested dynamic adjustments to staffing of the plurality of resources.

Without in any way limiting the scope, interpretation, or application of the claims appearing below, advantages of one or more of the exemplary embodiments disclosed herein include enabling staffing of resources associated with customer support operations based upon estimation of expected interaction volumes for various time periods while taking multiple customer intentions and plurality of interaction channels into account. Staffing of resources based on such predicted interaction volumes as opposed to staffing based on historical staffing patterns enables reducing instances of under staffing and over staffing of resources, thereby precluding bad customer experiences and/or operating losses. Moreover, techniques suggested herein enable dynamic (almost real-time) adjustments to staffing thereby enabling appropriate allocation of resources for handling fluctuations in volume of the customer interactions.

Additionally, the method and apparatus disclosed herein also suggest techniques for proactive contacting of customers who are likely to interact, thereby aiding to preclude situations, where customer interaction traffic exceeds resource deployment at the customer support facility. Moreover, techniques disclosed herein also enable (1) admission control, where it is determined whether to offer assistance to a particular customer now or later, while taking into account all possible channels and other customers, and (2) skill and/or priority based matching of resources to customer interaction requirements and techniques.

Although the present technology has been described with reference to specific exemplary embodiments, it is noted that various modifications and changes may be made to these embodiments without departing from the broad spirit and scope of the present technology. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 200, the processor 202, the memory 204 and the I/O module 206 may be enabled using software and/or using transistors, logic gates, and electrical circuits (for example, integrated circuit circuitry such as ASIC circuitry). Various embodiments of the present technology may include one or more computer programs stored or otherwise embodied on a computer-readable medium, wherein the computer programs are configured to cause a processor or computer to perform one or more operations (for example, operations explained herein with reference to FIG. 7). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the present disclosure, as discussed above, may be practiced with steps and/or operations in a different order, and/or with hardware elements in configurations, which are different than those which, are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method, comprising:
  a processor receiving customer data corresponding to a plurality of customers of an enterprise;
  predicting, by the processor, at least one intention for each customer from among the plurality of customers using data corresponding to each customer in the customer data, the prediction of the at least one intention for each customer configuring a plurality of intentions;
  estimating, by the processor, an expected volume of interactions for at least one time period based on the plurality of intentions, each interaction in the expected volume of interactions associated with one or more interaction attributes, wherein estimating the expected volume of interactions for the at least one time period comprises:
  determining, for each customer, if a likelihood of a customer initiating an interaction with the enterprise for the respective at least one intention exceeds a dynamically updated threshold value;
  predicting a time of interaction and a preferred interaction channel for one or more customers for whom it is determined that the likelihood of initiating the interaction with the enterprise exceeds the dynamically updated threshold value; and
  computing an aggregate number of interactions corresponding to the at least one time period based on the predicted time of interaction and the interaction channel preferred by the one or more customers, wherein the aggregate number of interactions configures the estimate of the expected volume of interactions for the at least one time period;
  receiving resource data corresponding to a plurality of machine-based resources of the enterprise, each machine-based resource from among the plurality of machine-based resources associated with a plurality of resource attributes;
  mapping, by the processor, at least one machine-based resource from among the plurality of machine-based resources to each interaction in the expected volume of interactions based on a match between respective machine-based resource attributes associated with the at least one machine-based resource and the one or more interaction attributes associated with each interaction;
  facilitating, by the processor, an allocation of the plurality of machine-based resources of the enterprise based, at least in part, on the mapping of the at least one machine-based resource to each interaction;
  dynamically adjusting assignment of one or more machine-based resources from among the plurality of machine-based resources for at least one forthcoming time period upon detecting an occurrence of at least one event indicating a change in respective expected volume of interactions; and
  facilitating, by the processor, proactive initiation of interactions with at least one customer from among the one or more customers for whom it is determined that the likelihood of initiating the interaction with the enterprise exceeds the dynamically updated threshold value.

2. The method of claim 1, wherein the data corresponding to each customer comprises information related to at least one of a profile of a customer, one or more interactions of the customer with the enterprise on one or more interaction channels, one or more locations associated with the customer, a presence of the customer in the one or more interaction channels, a current attention of the customer in an interaction channel from among the one or more interaction channels, social interactions of the customer and events of significance to the customer.

3. The method of claim 1, wherein the resource data comprises data corresponding to each machine-based resource from among the plurality of machine-based resources, the data corresponding to each resource comprising information related to at least one of a type of a resource, an identification of the resource, a service level agreement associated with the machine-based resource and a performance history of the machine-based resource.

4. The method of claim 1, wherein at least one resource attribute from among the plurality of resource attributes relates to a capability of the machine-based resource and an availability status of the machine-based resource.

5. The method of claim 1, wherein the one or more interaction attributes associated with each interaction comprises information related to at least one of an intention of a customer associated with an interaction, a priority level associated with the interaction and a customer lifetime value (CLV) of the customer.

6. The method of claim 1, further comprising:
  the processor tracking an activity of a customer on an interaction channel from among one or more interaction channels;
  determining, by the processor, if the customer requires an interaction assistance based on the tracked activity; and
  determining, by the processor, if a request for an interaction is to be proactively offered to the customer on the interaction channel upon determining that the customer requires the interaction assistance, the request for the interaction determined to be proactively offered based, at least in part, on a current staffing of the plurality of machine-based resources and a CLV of the customer.

7. The method of claim 6, further comprising:
  determining, by the processor, an appropriate time for proactively offering the request for the interaction to the customer on the interaction channel, the appropriate time determined based on determining a likelihood of a desired outcome to be greater than a pre-determined value.

8. The method of claim 1, wherein the plurality of customers of the enterprise comprises existing and prospective customers of the enterprise.

9. An apparatus, comprising:
  at least one processor; and
  a memory having stored therein machine executable instructions, that when executed by the at least one processor, cause the apparatus to:
    receive customer data corresponding to a plurality of customers of an enterprise;
    predict at least one intention for each customer from among the plurality of customers using data corresponding to each customer in the customer data, the prediction of the at least one intention for each customer configuring a plurality of intentions;
    estimate an expected volume of interactions for at least one time period based on the plurality of intentions, each interaction in the expected volume of interactions associated with one or more interaction attributes, wherein for estimating the expected volume of interactions for the at least one time period, the apparatus is further caused to:
      determine for each customer, if a likelihood of a customer initiating an interaction with the enterprise for the respective at least one intention exceeds a dynamically updated threshold value;
      predict a time of interaction and a preferred interaction channel for one or more customers for whom it is determined that the likelihood of initiating the interaction with the enterprise exceeds the dynamically updated threshold value; and
      compute an aggregate number of interactions corresponding to the at least one time period based on the predicted time of interaction and the interaction channel preferred by the one or more customers, wherein the aggregate number of interactions configures the estimate of the expected volume of interactions for the at least one time period;
    receive resource data corresponding to a plurality of machine-based resources of the enterprise, each machine-based resource from among the plurality of machine-based resources associated with a plurality of resource attributes;
    map at least one machine-based resource from among the plurality of machine-based resources to each interaction in the expected volume of interactions based on a match between respective machine-based resource attributes associated with the at least one machine-based resource and the one or more interaction attributes associated with each interaction;
    facilitate an allocation of the plurality of machine-based resources of the enterprise based, at least in part, on the mapping of the at least one machine-based resource to each interaction;
    dynamically adjust assignment of one or more machine-based resources from among the plurality of machine-based resources for at least one forthcoming time period upon detecting an occurrence of at least one event indicating a change in respective expected volume of interactions; and
    facilitate proactive initiation of interactions with at least one customer from among the one or more customers for whom it is determined that the likelihood of initiating the interaction with the enterprise exceeds the dynamically updated threshold value.

10. The apparatus of claim 9, wherein the data corresponding to each customer comprises information related to at least one of a profile of a customer, one or more interactions of the customer with the enterprise on one or more interaction channels, one or more locations associated with the customer, a presence of the customer in the one or more interaction channels, a current attention of the customer in an interaction channel from among the one or more interaction channels, social interactions of the customer and events of significance to the customer.

11. The apparatus of claim 9, wherein the resource data comprises data corresponding to each machine-based resource from among the plurality of machine-based resources, the data corresponding to each machine-based resource comprising information related to at least one of a type of machine-based resource, an identification of the machine-based resource, a service level agreement associated with the machine-based resource and a performance history of the machine-based resource.

12. The apparatus of claim 9, wherein at least one resource attribute from among the plurality of resource attributes relates to a capability of the machine-based resource and an availability status of the machine-based resource.

13. The apparatus of claim 9, wherein the one or more interaction attributes associated with each interaction comprises information related to at least one of an intention of a customer associated with an interaction, a priority level associated with the interaction and a customer lifetime value (CLV) of the customer.

14. The apparatus of claim 9, wherein the apparatus is further caused to:
  track an activity of a customer on an interaction channel from among one or more interaction channels;
  determine if the customer requires an interaction assistance based on the tracked activity; and
  determine if a request for an interaction is to be proactively offered to the customer on the interaction channel upon determining that the customer requires the interaction assistance, the request for the interaction determined to be proactively offered based, at least in part, on a current staffing of the plurality of machine-based resources and a CLV of the customer.

15. The apparatus of claim 14, wherein the apparatus is further caused to:
  determine an appropriate time for proactively offering the request for the interaction to the customer on the interaction channel, the appropriate time determined based on determining a likelihood of a desired outcome to be greater than a pre-determined value.

16. The apparatus of claim 9, wherein the plurality of customers of the enterprise comprises existing and prospective customers of the enterprise.

17. A non-transitory computer-readable medium storing a set of instructions that when executed cause a computer to perform a method comprising:
  receiving customer data corresponding to a plurality of customers of an enterprise;
    predicting at least one intention for each customer from among the plurality of customers using data corresponding to each customer in the customer data, the prediction of the at least one intention for each customer configuring a plurality of intentions;
    estimating an expected volume of interactions for at least one time period based on the plurality of intentions, each interaction in the expected volume of interactions associated with one or more interaction attributes, wherein for estimating the expected volume of interactions for the at least one time period, the method further:
- determines for each customer, if a likelihood of a customer initiating an interaction with the enterprise for the respective at least one intention exceeds a dynamically updated threshold value;
- predicts a time of interaction and a preferred interaction channel for one or more customers for whom it is determined that the likelihood of initiating the interaction with the enterprise exceeds the dynamically updated threshold value; and
- computes an aggregate number of interactions corresponding to the at least one time period based on the predicted time of interaction and the interaction channel preferred by the one or more customers, wherein the aggregate number of interactions configures the estimate of the expected volume of interactions for the at least one time period;

receiving resource data corresponding to a plurality of machine-based resources of the enterprise, each machine-based resource from among the plurality of machine-based resources associated with a plurality of resource attributes;

mapping at least one machine-based resource from among the plurality of machine-based resources to each interaction in the expected volume of interactions based on a match between respective machine-based resource attributes associated with the at least one machine-based resource and the one or more interaction attributes associated with each interaction;

facilitating an allocation of the plurality of machine-based resources of the enterprise based, at least in part, on the mapping of the at least one machine-based resource to each interaction;

dynamically adjusting assignment of one or more machine-based resources from among the plurality of machine-based resources for at least one forthcoming time period upon detecting an occurrence of at least one event indicating a change in respective expected volume of interactions; and facilitating proactive initiation of interactions with at least one customer from among the one or more customers for whom it is determined that the likelihood of initiating the interaction with the enterprise exceeds the dynamically updated threshold value.

18. The computer-readable medium of claim 17, wherein at least one resource attribute from among the plurality of resource attributes relates to a capability of the machine-based resource and an availability status of the machine-based resource.

19. The computer-readable medium of claim 17, wherein the one or more interaction attributes associated with each interaction comprises information related to at least one of an intention of a customer associated with an interaction, a priority level associated with the interaction and a customer lifetime value (CLV) of the customer.

20. The computer-readable medium of claim 17, wherein the method further comprises:
- tracking an activity of a customer on an interaction channel from among one or more interaction channels;
- determining if the customer requires an interaction assistance based on the tracked activity; and
- determining if a request for an interaction is to be proactively offered to the customer on the interaction channel upon determining that the customer requires the interaction assistance, the request for the interaction determined to be proactively offered based, at least in part, on a current staffing of the plurality of machine-based resources and a CLV of the customer.

21. The computer-readable medium of claim 20, wherein the method further comprises:
- determining an appropriate time for proactively offering the request for the interaction to the customer on the interaction channel, the appropriate time determined based on determining a likelihood of a desired outcome to be greater than a pre-determined value.

\* \* \* \* \*

UNITED STATES PATENT AND TRADEMARK OFFICE
CERTIFICATE OF CORRECTION

PATENT NO. : 10,339,477 B2  
APPLICATION NO. : 14/964540  
DATED : July 2, 2019  
INVENTOR(S) : Pallipuram V. Kannan and Kranthi Mitra Adusumilli Page 1 of 1

It is certified that error appears in the above-identified patent and that said Letters Patent is hereby corrected as shown below:

On the Title Page

(71) Change "[24] 7.ai, Inc., San Jose, CA (US)" to --[24]7.ai, Inc., San Jose, CA (US)--.

(73) Change "[24] 7.ai, Inc., San Jose, CA (US)" to --[24]7.ai, Inc., San Jose, CA (US)--.

Signed and Sealed this  
Thirteenth Day of August, 2019

Andrei Iancu  
*Director of the United States Patent and Trademark Office*